(12) United States Patent
Yoshioka

(10) Patent No.: US 7,175,015 B2
(45) Date of Patent: Feb. 13, 2007

(54) BILL VALIDATION DEVICE AND GAMING MACHINE INCLUDING THE DEVICE

(75) Inventor: Kazuei Yoshioka, Tokyo (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 0 days.

(21) Appl. No.: 11/069,062

(22) Filed: Mar. 2, 2005

(65) Prior Publication Data

US 2005/0194233 A1  Sep. 8, 2005

(30) Foreign Application Priority Data

Mar. 5, 2004  (JP) .............................. 2004-062257

(51) Int. Cl.
*G07F 7/04* (2006.01)

(52) U.S. Cl. .................................................. 194/206
(58) Field of Classification Search ................ 194/206, 194/205, 207, 302, 350
See application file for complete search history.

(56) References Cited

U.S. PATENT DOCUMENTS

| | | | |
|---|---|---|---|
| 4,598,810 A | 7/1986 | Shore et al. | |
| 4,884,212 A | 11/1989 | Stutsman | |
| 5,770,533 A | 6/1998 | Franchi | |
| 5,791,449 A | 8/1998 | Deaville et al. | |
| 5,907,141 A * | 5/1999 | Deaville et al. | 235/375 |
| 6,168,522 B1 | 1/2001 | Walker et al. | |
| 6,227,446 B1 | 5/2001 | Haney et al. | |
| 6,264,102 B1 | 7/2001 | Haney et al. | |
| 6,270,010 B1 | 8/2001 | Junkins et al. | |
| 6,367,691 B1 | 4/2002 | Graef et al. | |
| 6,367,692 B1 | 4/2002 | Junkins et al. | |
| 6,371,368 B1 | 4/2002 | Owens | |
| 6,371,473 B1 * | 4/2002 | Saltsov et al. ............. 271/3.01 |
| 6,607,124 B1 | 8/2003 | Junkins et al. | |
| 6,616,535 B1 | 9/2003 | Nishizaki et al. | |
| 2004/0212143 A1 | 10/2004 | Yoshioka et al. | |

FOREIGN PATENT DOCUMENTS

| | | |
|---|---|---|
| CN | 1220021 | 6/1999 |
| GB | 2 244 583 | 12/1991 |
| JP | 2003-299875 | 10/2003 |
| JP | 2004-323148 | 11/2004 |
| WO | WO 00/31670 | 6/2000 |

* cited by examiner

*Primary Examiner*—Patrick Mackey
*Assistant Examiner*—Mark J. Beauchaine
(74) *Attorney, Agent, or Firm*—Leydig, Voit & Mayer, Ltd.

(57) ABSTRACT

A bill validation device includes a main body having a bill validation part for validating a bill inserted through a bill insertion opening and a bill conveyance mechanism for conveying a bill, and a bill holder attached to the main body for holding bills determined as valid by the bill validation part. The main body has a data recording medium insertion opening into which a card-shaped data recording medium may be inserted and includes a data recording medium processor for at least one of writing data to and reading data from the data recording medium.

10 Claims, 6 Drawing Sheets

BILL VALIDATION DEVICE AND GAMING MACHINE INCLUDING THE DEVICE

CROSS-REFERENCE TO THE RELATED APPLICATION(S)

This application is based upon and claims a priority from the prior Japanese Patent Application No. 2004-062257 filed on Mar. 5, 2004, the entire contents of which are incorporated herein by reference.

BACKGROUND OF THE INVENTION

1. Field of the Invention

The present invention relates to a bill validation device for validating a bill to be used for playing a game such as a pinball game and a card game, and also to a gaming machine including the bill validation device.

2. Description of the Related Art

Some gaming machines such as a slot machine are known each of which includes a bill validation device for validating a bill to be used for playing a game. For example, the present applicant has proposed this type of bill validation device in Japanese Patent Application No. 2003-118203, previously filed. The bill validation device has a bill validation part for validating a bill inserted through a bill insertion opening, a mechanism for conveying a bill, and a bill stacker (cashbox) for stacking bills, the validity of which has been determined, i.e., which is authentic, by the bill validation part. The bill stacker is removably attached to a main body of the bill validation device so that bills stacked in the stacker can be withdrawn.

Some other gaming machines are known each of which includes a data recording medium processing unit (card unit) for processing a data recording medium (data recording card) such as an IC card, as disclosed in Laid-open Japanese Patent Publication No. 2003-299875. Such a gaming machine including a data recording medium processing unit issues a data recording medium recording payout information as required, which can advantageously enhance the security. Moreover, since a data recording medium is reusable, the effort for supplementing paper can be saved and also waste of paper can be prevented, which is economical, compared with a gaming machine outputting payout information on paper, for example.

SUMMARY OF THE INVENTION

In order to enhance the convenience of players, one gaming machine may include both bill validation device and data recording medium processing unit. However, in this case, since a cabinet of the gaming machine must be large enough for accommodating the two units, the gaming machine must be large, which may not contribute to effective use of space.

Accordingly, it is an object of the present invention to provide a bill validation device, which can be attached to a gaming machine so that the gaming machine can accept both bill and card-shaped data recording medium and which can derive effective use of space without increasing the size of the gaming machine, and also to provide a gaming machine including the bill validation device.

According to a first aspect of the invention, there is provided a bill validation device comprising: a main body having a bill validation part for validating a bill inserted through a bill insertion opening and a mechanism for conveying a bill; and a bill holder attached to the main body for holding the bill determined as valid by the bill validation part. The bill validation device is characterized in that the main body has a data recording medium insertion opening to which a card-shaped data recording medium is inserted and includes a data recording medium processor which performs at least one of writing and reading of data to/from the data recording medium.

In the bill validation device according to the first aspect, since the data recording medium processor for processing a data recording medium is incorporated in the main body of the bill validation device, a bill validation device and a data recording medium processor do not have to be provided as separate units in an external apparatus such as a gaming machine. Therefore, the size of the external apparatus is not increased, which can derive effective use of space.

According to a second aspect of the invention, there is provided a gaming machine comprising a cabinet provided with a gaming area and a bill validation device placed within the cabinet. The bill validation device includes: a main body having a bill validation part for validating a bill inserted through a bill insertion opening and a mechanism for conveying a bill; and a bill holder attached to the main body for holding the bill determined as valid by the bill validation part. The gaming machine is characterized in that: the main body has a data recording medium insertion opening to which a card-shaped data recording medium is inserted and includes a data recording medium processor which performs at least one of writing and reading of data to/from the data recording medium; and the bill insertion opening and the data recording medium insertion opening are placed so as to expose on a surface of the cabinet.

In the gaming machine according to the second aspect, since the data recording medium processor for processing a data recording medium is incorporated in the main body of the bill validation device disposed within the cabinet of the machine, a bill validation device and a data recording medium processor do not have to be provided as separate units within the cabinet. Therefore, the size of the gaming machine is not increased, which can derive effective use of space.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Preferred embodiments of the invention will be described with reference to drawings.

Figure 1:
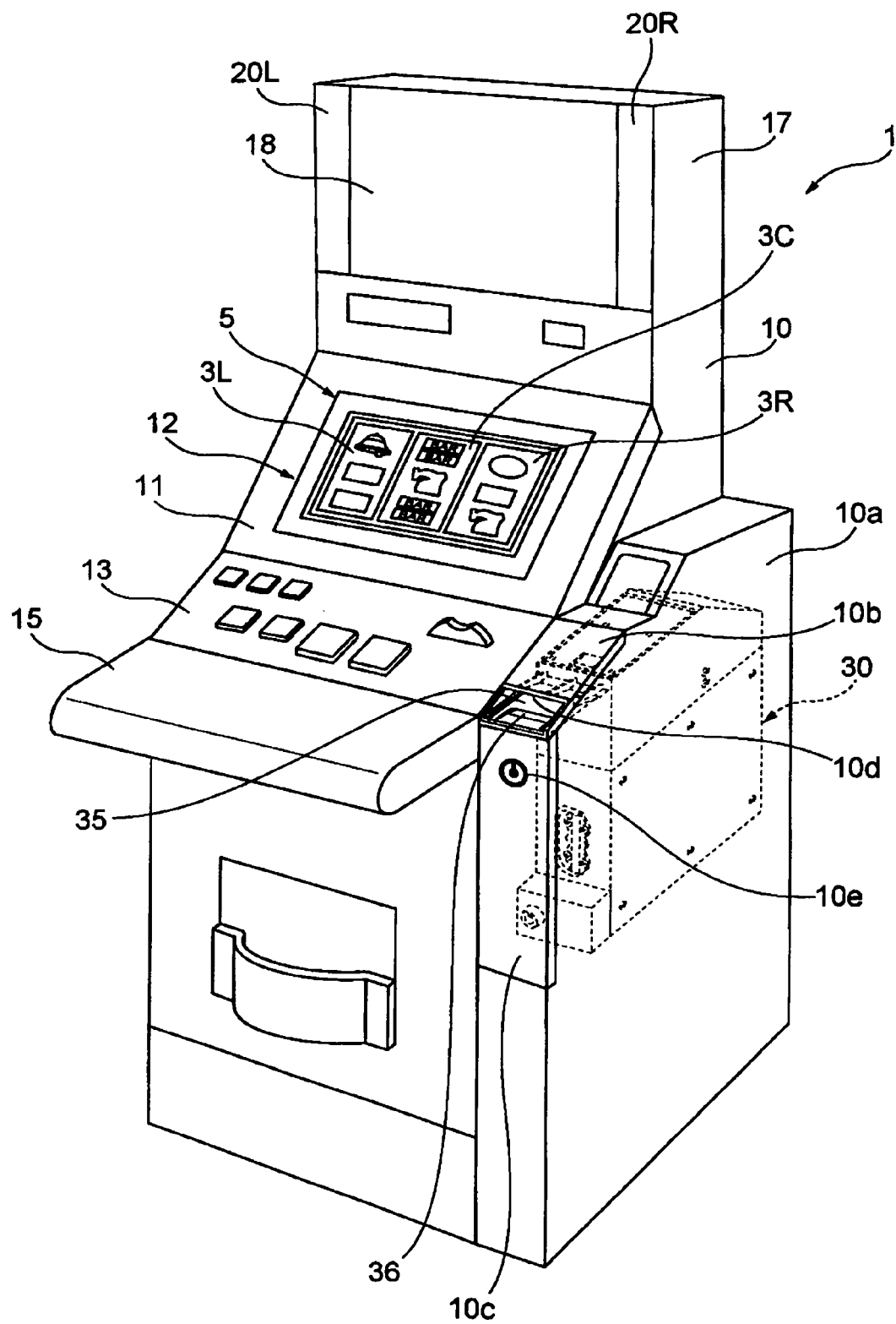
FIG. 1 is a perspective view showing the appearance of a gaming machine according to an embodiment of the invention.

First of all, a construction of the appearance of a slot machine serving as a gaming machine according to an embodiment of the invention will be described with reference to FIG. 1. A slot machine 1 of this embodiment includes a cabinet 10.

The cabinet 10 includes a door 11, which is openable and closable with respect to the cabinet 10. A gaming area 5 showing three reels 3L, 3C and 3R, which are arranged laterally at a substantial center of the door 11 in lateral direction, is formed on the surface on the door 11. Each of the reels 3L, 3C and 3R is rotatable in vertical direction and has multiple kinds of symbol thereon. The door 11 is upwardly slanted toward the rear of the cabinet 10 such that the reels 3L, 3C and 3R are easily visible when a player sits down. The cabinet 10 further includes a control panel 13 below the door 11. The control panel 13 has a more gently slanted plane than that of the door 11. The control panel 13 has various operation elements including buttons such as a BET button, a reel rotate button, and a reel stop button, and an insertion opening for inserting a coin, which are required for playing a game.

An arm rest 15 having a substantially horizontal plane is provided on the proximal side of the control panel 13 so that a player can sit on a chair (not shown) with his/her arm placed on the arm rest 15 and can easily operate the operation elements provided on the control panel 13.

The cabinet 10 further includes a front panel 17 vertically disposed behind the door 11. The front panel 17 includes a payout table 18, speakers 20L and 20R, and the like. The payout table 18 displays, for example, a winning combination of symbols and a payout number. The speakers 20L and 20R output a sound effect for enhancing the amusement of a game while a player is playing the game.

The cabinet 10 may further include any device for enhancing the amusement of a game. For example, a transparent liquid crystal display device 12 through which the reels 3L, 3C and 3R are visible may be disposed on the door 11. The liquid crystal display device 12 may display a dynamic effect image in accordance with a game or display information required by a player for developing a game with advantage. In this case, the transparent liquid crystal display device 12 has a protective glass, a display panel, a liquid crystal panel, a light-guide plate, a reflective film, a fluorescent lamp, and a table carrier package (TCP) having an IC for driving the liquid crystal panel.

The slot machine 1 has a housing 10a on one side of the cabinet 10 for holding a bill validation device 30, which will be described later. As shown in FIG. 1, the housing 10a has a substantially half height of that of the cabinet 10 and has a substantially parallelepiped form which is thin in the width direction. The bill validation device 30 disposed within the housing 10a is electrically connected to a controller which is incorporated in the cabinet 10 to control a game with the reels 3L, 3C and 3R. The housing 10a may be integrated with the cabinet 10, or may be removably attached to the cabinet 10 to serve as an independent housing for the bill validation device 30. The bill validation device 30 is held and fixed at a predetermined position by a locking structure within the housing 10a.

The housing 10a rotatably supports a door 10b and a door 10c on the top face and front face, respectively. The doors 10b and 10c can be opened upward and frontward, respectively, like a double door so that the bill validation device 30 can be withdrawn. The door 10b on the top face has an opening 10d to expose a bill insertion opening 35 and a card insertion opening 36 on a main body 31 of the bill validation device 30, which will be described later. The door 10c on the front face has a key hole 10e for locking the doors 10b and 10c.

Figure 2:
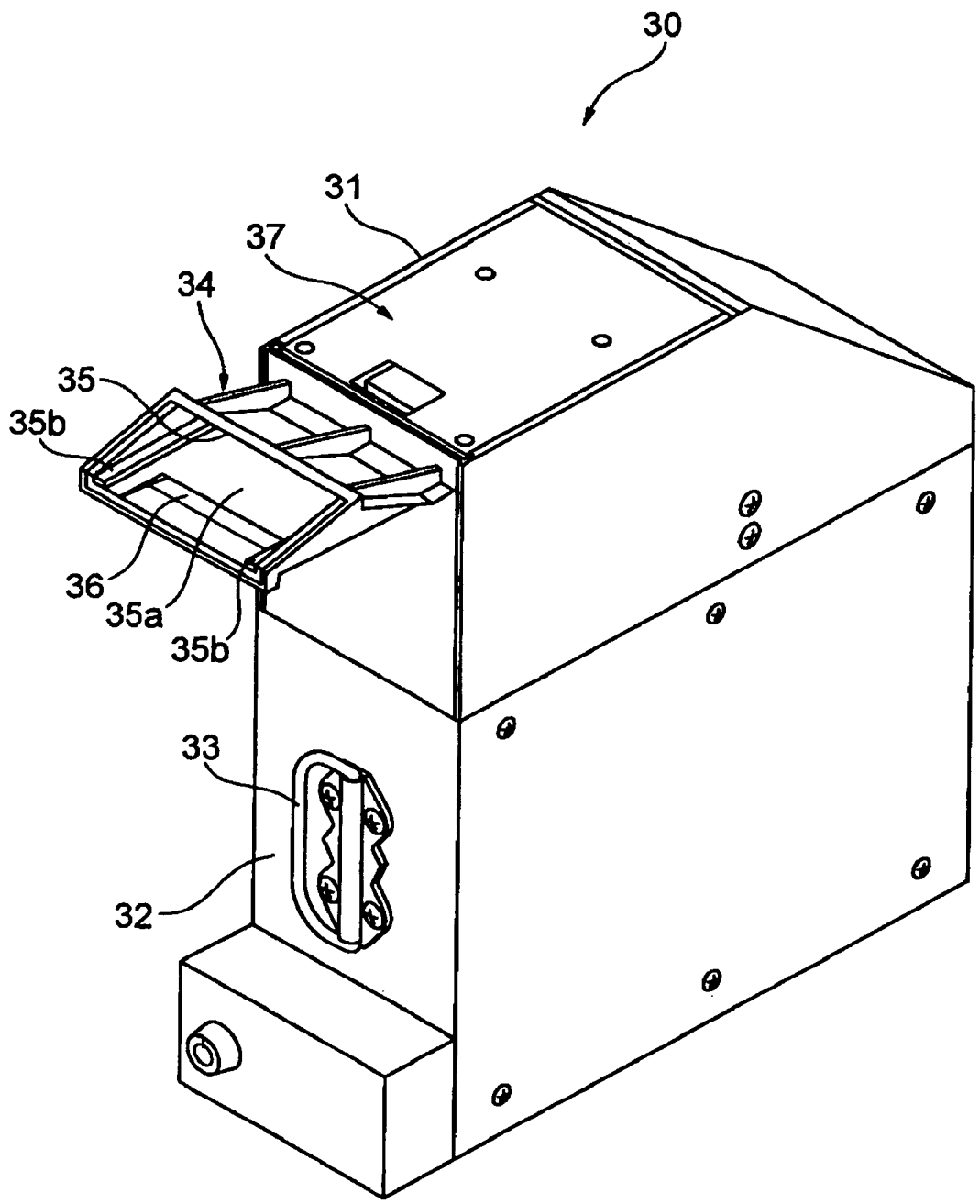
FIG. 2 is a perspective view showing the appearance of a bill validation device attached to the gaming machine in FIG. 1.
Figure 3:
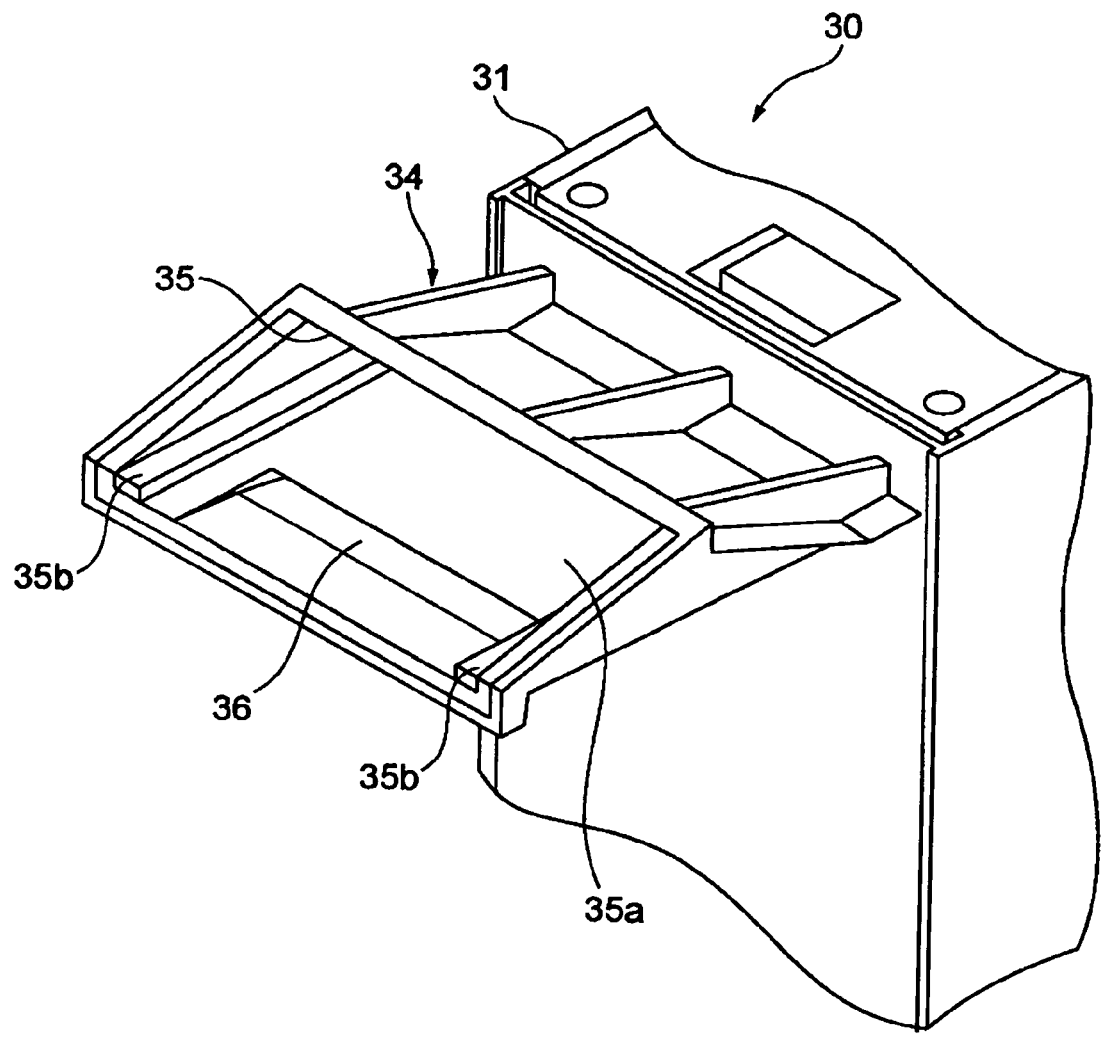
FIG. 3 is an enlarged perspective view of a part including bill insertion and card insertion openings of the bill validation device in FIG. 2.
Figure 4:
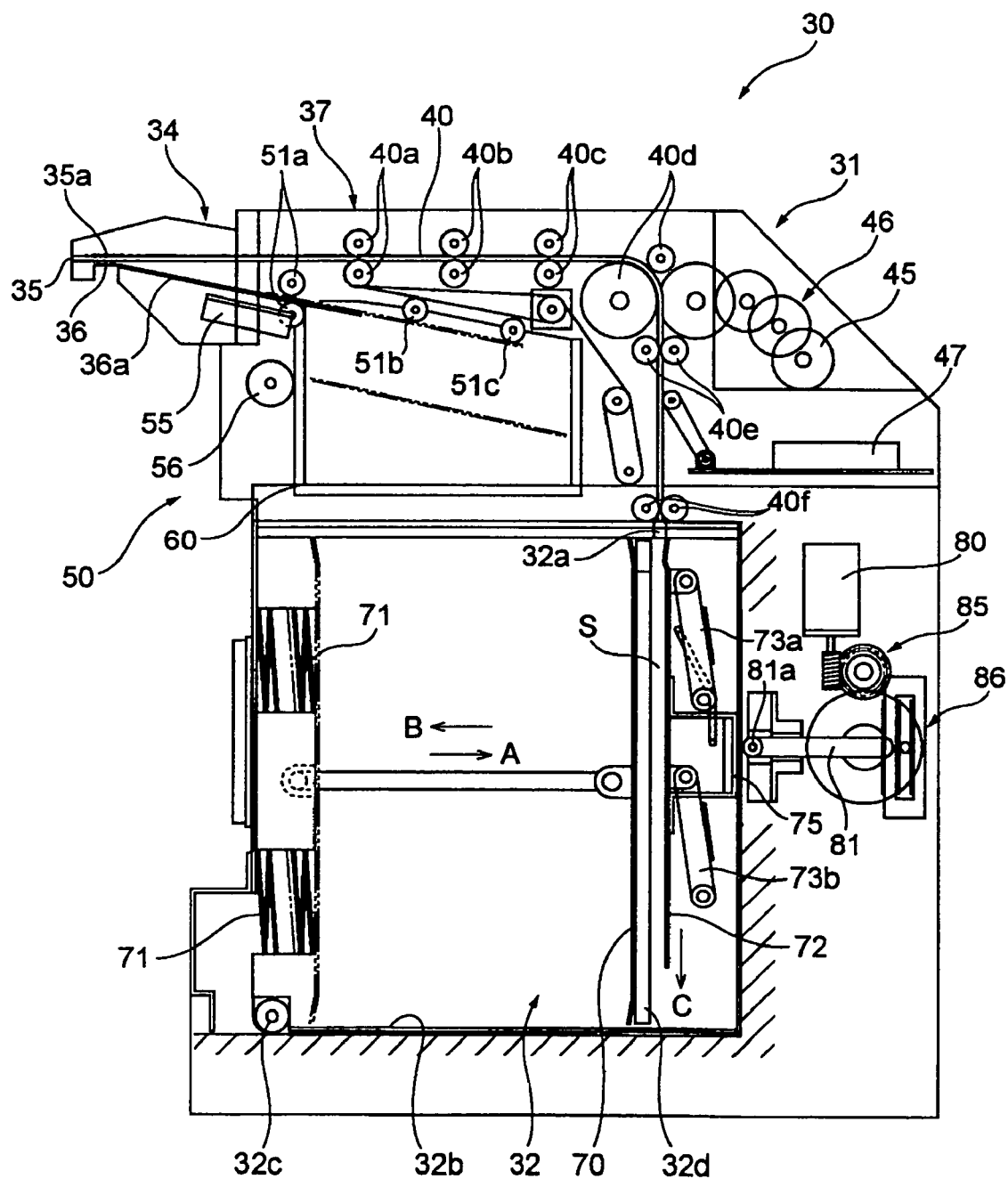
FIG. 4 is a schematic diagram showing an internal construction of the bill validation device in FIG. 2.
Figure 5A:
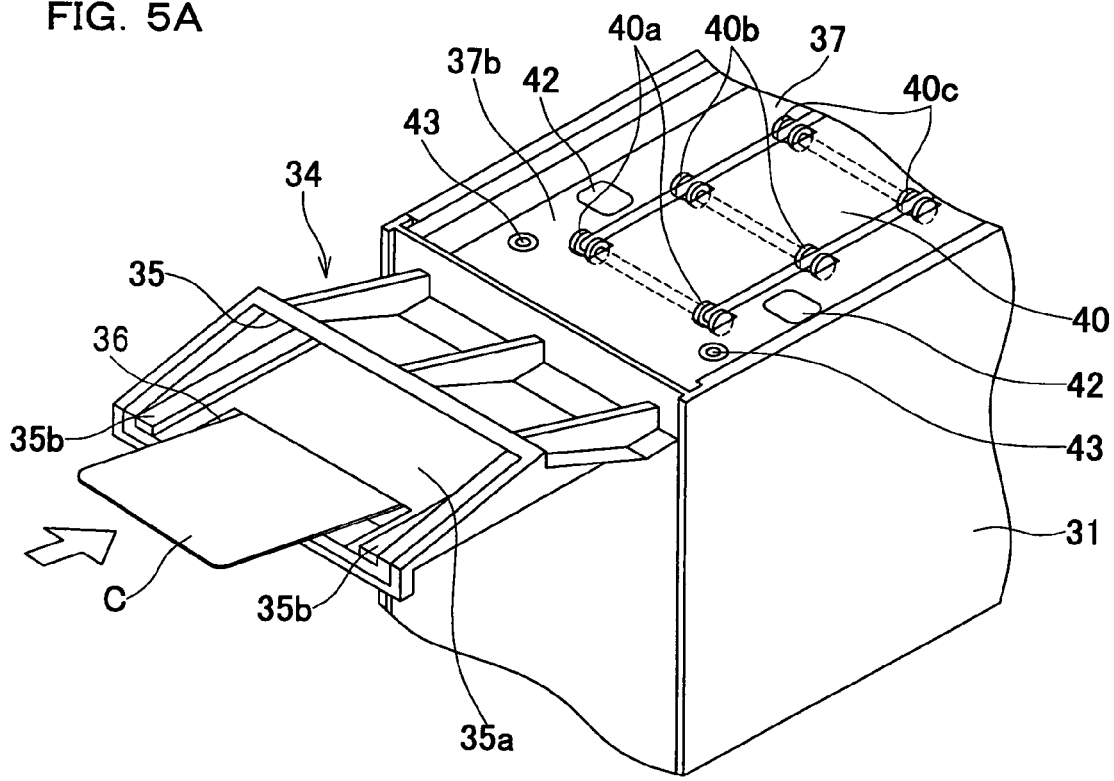
FIG. 5A is a perspective view showing a state where a card-shaped data recording medium is inserted to the card insertion opening.
Figure 5B:
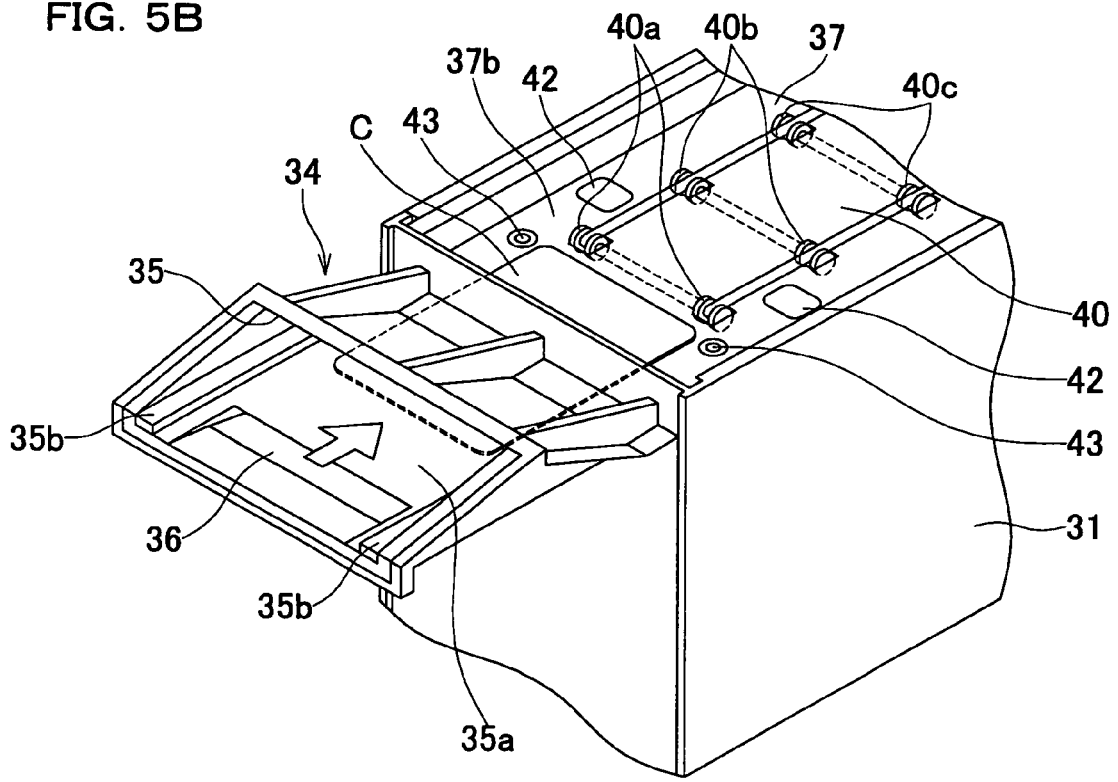
FIG. 5B is a perspective view showing a state where a card-shaped data recording medium is improperly inserted to the bill insertion opening.
Figure 6:
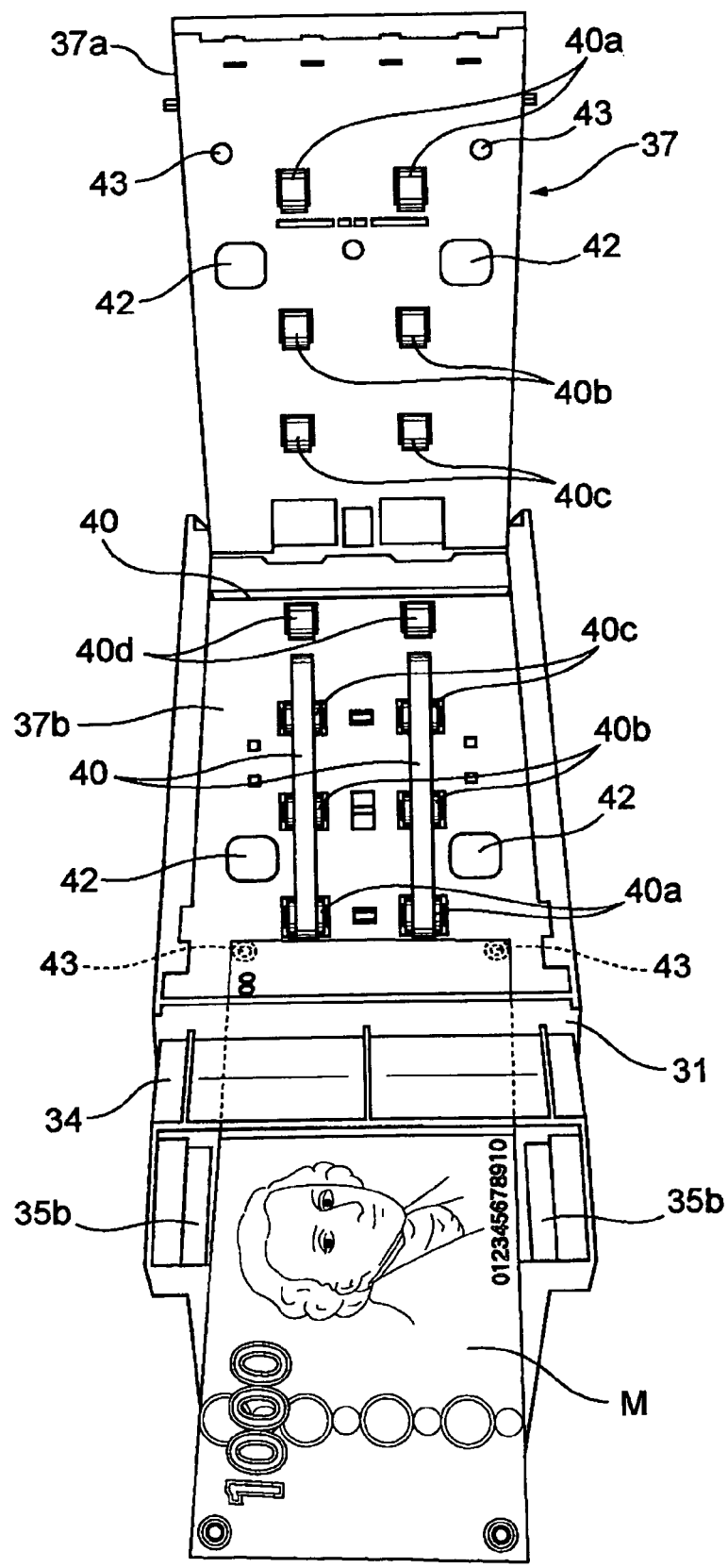
FIG. 6 is a diagram showing a state where a bill inserted to the bill insertion opening is being fed to the bill validation part.

Next, a construction of the bill validation device 30 attached to the slot machine 1 will be described with reference to FIGS. 2, 3, 4, 5A, 5B, and 6. FIG. 2 is a perspective view showing the appearance of the bill validation device; FIG. 3 is an enlarged perspective view of a part including the bill insertion opening and card insertion opening in the bill validation device in FIG. 2; FIG. 4 is a schematic diagram showing an internal construction of the bill validation device in FIG. 2; FIG. 5A is a perspective view showing a state where a card-shaped data recording medium (referred to as a "card", hereinafter) is inserted to the card insertion opening; FIG. 5B is a perspective view showing a state where a card is improperly inserted to the bill insertion opening; and FIG. 6 is a diagram showing a state where a bill inserted to the bill insertion opening is being fed to the bill validation part.

The bill validation device 30 has the main body 31 and a stacker 32 for stacking bills. The stacker 32 is attached to the main body 31 in a manner where the stacker 32 can be withdrawn to the proximal side by gripping a handle 33. The main body 31 has a medium receiver 34 projecting in a beak form. The medium receiver 34 has the bill insertion opening 35 for receiving a bill and the card insertion opening 36 to which a card is inserted. The bill insertion opening 35 and the card insertion opening 36 are placed at substantially the same position.

More specifically, the bill insertion opening 35 has the bottom face defined by a flat guide plane 35a, on which a bill is placed by a player and which then guides the bill substantially horizontally. The bill insertion opening 35 opens in the direction orthogonal to the guide plane 35a. The card insertion opening 36 opens on the guide plane 35a. In other words, a bill is inserted to the bill insertion opening 35 horizontally, while a card is inserted to the card insertion opening 36 diagonally downward. Defining walls 35b are provided on both sides of the guide plane 35a of the bill insertion opening 35 with the spacing therebetween substantially equal to a width of a bill. The width of the card insertion opening 36 is smaller than the spacing between the defining walls 35b so that a bill cannot be inserted to the card insertion opening 36. That is, the width of a bill is larger than that of a card.

The main body 31 further includes a bill validation part 37 on the top face. The bill validation part 37 validates a bill inserted through the bill insertion opening 35. The bill validation part 37 includes, as shown in FIGS. 5A and 5B, a bill path 40 and bill conveyance roller pairs 40a, 40b, 40c, and 40d disposed in series on the path 40. The bill path 40 has a bill conveyance mechanism with a belt. As shown in FIG. 6, the roller pairs 40a, 40b, 40c, and 40d are rotatably supported by a hinged cover 37a and a flat frame 37b of the main body 31, respectively. The cover 37a and the flat frame 37b are included in the bill validation part 37. The bill path 40 includes a belt wound about the bill conveyance roller pairs rotatably supported by the frame 37b of the main body 31. The bill path 40 is formed in series with the guide plane 35a and bended downward at substantially right angle on the roller pair 40d, as shown in FIG. 4, to guide a bill to the stacker 32. The part extending to the bottom of the bill path 40 also includes roller pairs 40e and 40f for conveying a bill.

As shown in FIG. 6, the bill validation part 37 includes bill validation sensors 42 and bill sensors 43. The bill validation sensors 42 have a function of validating a bill. The bill sensors 43 can detect a bill without detecting a card. The bill sensors 43 are two pairs of optical sensors, each pair of which includes light-receiving and light-emitting elements oppositely arranged on the cover 37a and the frame 37b, respectively, at a spacing between the pairs wider than the card width in the width direction and at positions corresponding to both width ends of a bill.

More specifically, as shown in FIG. 6, when a bill M is inserted to the bill insertion opening 35 along the defining walls 35b, the fact that the bill M has been inserted is identified when the two pairs of bill sensors 43 arranged at positions near both width ends of the bill M simultaneously detects the bill M to output detection signals. Here, as shown in FIG. 5B, when a card C is inserted to the bill insertion opening 35 improperly, the two pairs of bill sensors 43 do not output detection signals simultaneously because the width of the card C is smaller than that of a bill. As a result, it is not identified that a bill is inserted.

As shown in FIG. 4, the bill conveyance roller pairs 40a to 40f can be rotated in the forward and reverse directions by a motor 45 and a known power transmission mechanism including a gear train 46 connecting to the motor 45. The main body 31 further includes a control circuit substrate 47, which determines the validity relating to the authenticity of a bill based on signals from the bill validation sensors 42. The control circuit substrate 47 further controls driving of the motor 45 based on signals from the sensors 42 and 43. Thus, only when the two pairs of bill sensors 43 output detection signals simultaneously and the bill validation sensors 42 determine that a bill is valid, the roller pairs 40a, 40b, 40c and 40 are driven by the motor 45 to feed the bill to the stacker 32.

Accordingly, even when the card C is inserted to the bill insertion opening 35 improperly, the two pairs of bill sensors 43 do not output detection signals simultaneously, which does not drive the motor 45. Therefore, the card C is prevented from entering into the inside of the main body 31. When the bill validation sensors 42 determine that a bill is not valid, the motor 45 is driven in the reverse direction to eject the bill from the bill insertion opening 35.

A data recording medium processor 50 is incorporated in the main body 31 of the bill validation device 30. The data recording medium processor 50 can write information and read recorded information to/from a card inserted through the card insertion opening 36.

The data recording medium processor 50 has a card conveyance mechanism below the bill path 40. The card conveyance mechanism includes a card path 36a connecting to the card insertion opening 36, pinch rollers 51a and card conveyance rollers 51b and 51c, which are serially provided along the card path 36a. The card insertion opening 36 and card path 36a guide a card diagonally downward to prevent the interference with the bill path 40.

The data recording medium processor 50 further includes a card reader/writer 55 on the card path 36a. The card reader/writer 55 can read and write information from/to a card guided to the card path 36a. The card reader/writer 55 is adapted to read/record information in accordance with a type of an inserted card such as an optical card, magnetic card, a magneto-optical card, and an IC card.

The pinch rollers 51a and card conveyance roller pairs 51b and 51c can be rotated in the forward and reverse directions by a motor 56 and a known power transmission mechanism including a gear train (not shown) connecting to the motor 56. The driving of the motor 56 is controlled by the control circuit substrate 47 based on a detection signal from a sensor (not shown) for detecting a card.

The data recording medium processor 50 further includes a card stacker 60 for stacking cards. The card stacker 60 may have a function, for example, of collecting used cards, or of stacking cards on which payout information is to be recorded by the card reader/writer 55 and then which is issued to a player.

The stacker 32 has a bill through-hole 32a on the top face at a position corresponding to the bill path 40 when the stacker 32 is attached to the main body 31. Bills validated by the bill validation part 37 are sequentially stacked in the stacker 32 through the bill through-hole 32a. The stacker 32 has a lid 32b on the bottom face, which is openable by rotating about a hinge 32c so that bills stacked in the stacker 32 can be withdrawn.

The stacker 32 internally includes a stacking mechanism for stacking bills, which are sequentially fed into the stacker 32. Driving members for driving the stacking mechanism is provided to the main body 31.

The stacking mechanism includes a supporting plate 70, compression springs 71, a press-in plate 72, and a pair of arms 73a and 73b. The supporting plate 70 supports bills. The compression springs 71 bias the supporting plate 70 to the direction indicated by an arrow A. The press-in plate 72 presses a bill, which is conveyed through the bill through-hole 32a, toward the supporting plate 70. Both ends of each of the arms 73a and 73b are supported by means of a shaft such that the press-in plate 72 can move in the directions indicated by arrows B and C. The arms 73a and 73b are connected to the press-in plate 72 and are also connected to a support plate 75 abutted on a reciprocating rod 81, which will be described later. Thus, the arms 73a and 73b functions as a parallel crank mechanism.

The driving members for driving the stacking mechanism include a motor 80 and the reciprocating rod 81 which reciprocates in the directions indicated by the arrows A and B. A gear 85 as a power transmission mechanism and a cam mechanism 86 are provided between the motor 80 and the reciprocating rod 81. The cam mechanism 86, which is connected to the reciprocating rod 81, converts the rotary motion of the gear 85 into the reciprocating motion.

The motor 80 is driven under the control of the control circuit substrate 47 every time a bill is conveyed along the bill path 40 through the bill through-hole 32a. When a bill is conveyed to a space S between the supporting plate 70 and the press-in plate 72, the motor 80 is rotationally driven, and the reciprocating rod 81 is moved in the direction indicated by the arrow B through the gear 85 and cam mechanism 86. A roller 81a is supported at the distal end of the reciprocating rod 81 and is abutted on the support plate 75 through a hole (not shown) in the stacker 32 so that the support plate 75 can be slid in the direction indicated by the arrow B. In conjunction therewith, the press-in plate 72 moves integrally with the support plate 75 in the both directions indicated by the arrows B and C through the arms 73a and 73b, to thereby press the bill toward the supporting plate 70 against a biasing force of the compression springs 71. Accordingly, since the press-in plate 72 also moves in the direction indicated by the arrow C, a curved bill is straightened and is pressed toward the supporting plate 70. Though a biasing force of the compression springs 71 acts on bills supported by the supporting plate 70, a bill nearest to the supporting plate 70 is abutted on a pair of defining walls 32d (only one of which is shown in FIG. 4) aligned in a rib form on both side walls of the stacker 32 so that the bills can be kept stacked.

The bill validation device 30 and slot machine 1 having the above-described construction can provide advantages below.

Since the data recording medium processor 50 for processing a card-shaped data recording medium is incorporated in the main body 31 of the bill validation device 30, a bill validation device and data recording medium processor do not have to be provided as separate units in a gaming machine such as the slot machine 1. As a result, effective use of space is possible without an increase in size of the cabinet of the slot machine 1. Furthermore, since the data recording medium processor 50 as described above is incorporated in the slot machine 1, a card recording payout information instead of a conventional cash-out ticket can be issued to a player, which can advantageously enhance the security. Moreover, a card is reusable, the effort for supplementing paper can be saved and also waste of paper can be prevented, which is economical, compared with a gaming machine outputting payout information on paper, for example.

Since the bill insertion opening 35 and the card insertion opening 36 are placed at substantially the same position, the necessity for selecting an insertion opening based on a difference in medium, that is, a bill or a card, can be eliminated, which can enhance the convenience of players.

The bill sensors 43, which detect a bill only, are provided on a path from the bill insertion opening 35 to the inside of the main body 31. Accordingly, even when a card is inserted to the bill insertion opening 35 improperly, the card is prevented from entering into the inside of the main body 31. More specifically, when a card is inserted to the bill insertion opening 35 improperly, the bill sensors 43 do not output detection signals thereby not to drive the motor 45, the driving of which is controlled based on signals from the sensor 43. Further in this case, a player can easily recognize the improper operation.

Since, in the slot machine 1 of this embodiment, the bill validation device 30 incorporating the data recording medium processor 50 is disposed within the housing 10*a* removably attached to the cabinet 10, the cabinet 10 can have a substantially horizontally symmetrical form with respect to the gaming area 5. Thus, the design characteristic of the machine 1 can be enhanced, and the housing 10*a* can be attached to a cabinet of any other gaming machines as required.

Having described the embodiments of the invention, the invention is not limited to the embodiments but may have constructions below.

Components of the data recording medium processor 50, such as a card path, a motor, and a card reader/writer incorporated, and the positions thereof may be varied in accordance with a card insertion position or a construction of a bill validation part. For example, one common insertion opening may be provided which functions as a bill insertion opening and a card insertion opening. In this case, a card reader/writer may be disposed on a path common to both bill and card, or a switching valve may be disposed on a path common to both bill and card to switch thereafter between a bill path and a card path in accordance with an inserted medium.

A card insertion opening may be placed on a path to the inside of the main body 31 with respect to the bill insertion opening 35, or a bill insertion opening and a card insertion opening may be placed next to each other in the width direction of the bill validation device 30. The positional relationship of a bill insertion opening and a card insertion opening is not limited to the arrangement at substantially the same position, but a bill insertion opening and a card insertion opening may be spaced apart.

The construction of the bill sensor 43 for detecting a bill without detecting a card can be changed in any manner.

Though the stacker 32 for stacking bills is removably attached to the main body 31 of the bill validation device 30 in this embodiment, the stacker 32 may be integrated with the main body 31. In addition, bills may be held in a holder in any manner, i.e., how bills are held is not limited to the stacking manner by means of the stacking mechanism shown in FIG. 4, for example.

The bill validation device may be disposed at any position within a cabinet of a gaming machine such as a slot machine. For example, in FIG. 1, both a bill insertion opening and a card insertion opening may be exposed on the control panel 13.

Furthermore, the invention is applicable to gaming machines other than a slot machine. The bill validation device according to the invention may be provided in an external apparatus such as a vending machine other than a gaming machine.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A bill validation device comprising:
   a main body having a bill validation part validating a bill inserted through a bill insertion opening and a mechanism conveying a bill inserted into the bill insertion opening;
   a bill holder attached to the main body and holding bills determined as valid by the bill validation part;
   a data recording medium insertion opening, into which a card-shaped data recording medium may be inserted, located in the main body;
   a data recording medium processor, at least writing data to or reading data from the data recording medium, the data recording medium processor being included in the main body; and
   a pair of sensors arranged at a spacing no larger than width of the bill insertion opening, detecting a bill on a path from the bill insertion opening into the main body, the spacing being larger than width of the data recording medium insertion opening.

2. The bill validation device according to claim 1, wherein the bill insertion opening and the data recording medium insertion opening are located at substantially the same position.

3. A gaming machine comprising:
   a cabinet having a gaming area; and
   a bill validation device located within the cabinet, the bill validation device including:
      a main body having a bill validation part validating a bill inserted through a bill insertion opening and a mechanism conveying a bill inserted into the bill insertion opening,
      a bill holder attached to the main body and holding bills determined as valid by the bill validation part,
      a data recording medium insertion opening, into which a card-shaped data recording medium may be inserted, located in the main body, a data recording medium processor, at least writing data to or reading data from the data recording medium, the data recording medium processor being included in the main body, and wherein the bill insertion opening and the data recording medium insertion opening are exposed on a surface of the cabinet, and a pair of sensors arranged at a spacing no larger than width of the bill insertion opening, detecting a bill on a path from the bill insertion opening into the main body, the spacing being larger than width of the data recording medium insertion opening.

4. The gaming machine according to claim 3, wherein the bill insertion opening and the data recording medium insertion opening are located at substantially the same position.

5. The gaming machine according to claim 3, further comprising a housing within which the bill validation device is located and which is removably attachable to the cabinet.

6. A bill validation device comprising:

a main body having a bill validation part validating a bill inserted through a bill insertion opening and a mechanism conveying a bill inserted into the bill insertion opening;

a bill holder attached to the main body and holding bills determined as valid by the bill validation part;

a data recording medium insertion opening, into which a card-shaped data recording medium may be inserted, located in the main body; and a data recording medium processor, at least writing data to or reading data from the data recording medium, the data recording medium processor being included in the main body, wherein the data recording medium insertion opening is located inside the bill insertion opening.

7. The bill validation device according to claim 6, comprising a pair of sensors arranged at a spacing no larger than width of the bill insertion opening, detecting a bill on a path from the bill insertion opening into the main body, the spacing being larger than width of the data recording medium insertion opening.

8. A gaming machine comprising:

a cabinet having a gaming area; and a bill validation device located within the cabinet, the bill validation device including:

a main body having a bill validation part validating a bill inserted through a bill insertion opening and a mechanism conveying a bill inserted into the bill insertion opening, a bill holder attached to the main body and holding bills determined as valid by the bill validation part a data recording medium insertion opening, into which a card-shaped data recording medium may be inserted, located in the main body, and a data recording medium processor, at least writing data to or reading data from the data recording medium, the data recording medium processor being included in the main body, wherein the bill insertion opening and data recording medium insertion opening are both exposed on the surface of a cabinet, and the data recording medium insertion opening is located inside the bill insertion opening.

9. The gaming machine according to claim 8, wherein the bill validation device comprises a pair of sensors arranged at a spacing no larger than width of a the bill insertion opening, detecting a bill on a path from the bill insertion opening into the main body, the spacing being larger than width of the data recording medium insertion opening.

10. The gaming machine according to claim 8, further comprising a housing within which the bill validation device is located and which is removably attachable to the cabinet.

* * * * *